United States Patent [19]

Diaz et al.

[11] Patent Number: 4,648,919
[45] Date of Patent: Mar. 10, 1987

[54] PROTECTION OF CABLE SPLICE

[75] Inventors: Stephen H. Diaz, Los Altos Hills, Calif.; Christian A. M. Debbaut, Cary; William H. Humphries, Raleigh, both of N.C.; Alvah A. Lawrence, Los Altos, Calif.; Glen W. Ragland, Dunwoody, Ga.; Gerald L. Shimirak, Raleigh, N.C.

[73] Assignee: Raychem Corp., Menlo Park, Calif.

[21] Appl. No.: 769,781

[22] Filed: Aug. 15, 1985

Related U.S. Application Data

[63] Continuation of Ser. No. 652,359, Sep. 18, 1984, abandoned.

[51] Int. Cl.$^4$ .............................................. H01B 13/06
[52] U.S. Cl. ...................................... 156/48; 156/49; 156/53; 156/56; 174/23 R; 174/88 R; 174/92; 428/36; 428/913
[58] Field of Search ...................... 156/48, 49, 53, 56; 174/23 R, 76, 88 R, 92; 428/36, 137, 304.4, 913

[56] References Cited

U.S. PATENT DOCUMENTS

| | | | |
|---|---|---|---|
| 3,339,011 | 8/1967 | Ewers et al. | 174/92 |
| 3,361,605 | 1/1968 | Gilbert | 156/48 |
| 3,455,336 | 7/1969 | Ellis | 138/99 X |
| 3,639,567 | 2/1972 | Hervig | 174/23 R X |
| 3,895,180 | 7/1975 | Plummer | 174/92 |
| 3,992,569 | 11/1976 | Hankins | 174/92 |
| 4,135,587 | 1/1979 | Diaz | 174/92 |
| 4,209,352 | 6/1980 | Diaz et al. | 156/49 |
| 4,283,239 | 8/1981 | Corke et al. | 156/85 |
| 4,461,736 | 7/1984 | Takagi | 264/46.5 |
| 4,466,843 | 8/1984 | Shimirak | 156/48 |
| 4,468,536 | 8/1984 | Van Noten | 174/92 |
| 4,511,415 | 4/1985 | Dienes | 156/48 |

OTHER PUBLICATIONS

Fukutomi et al., "Prefabricated Pressure Dam for Telephone Cable", Proceedings of 20th International Wire & Cable Symposium, 1971.
Pirelli General "Resinwrap Joints", brochure, Mar. 1964.
Pirelli General Cable Works Ltd, "Jointing Instructions for 'Resinwrap' Breeches Joint", Aug. 1973.

Primary Examiner—Robert A. Dawson
Attorney, Agent, or Firm—T. Gene Dillahunty

[57] ABSTRACT

A splice between two multiconductor cables is protected from ingress of water by a closure which is filled with a sealant which is pressurized by a bladder inside the closure to a pressure sufficient to force the sealant into the interstices of the splice and the interstices between the conductors in the cable, and the pressure is maintained by the bladder until the sealant cures or hardens.

5 Claims, 1 Drawing Figure

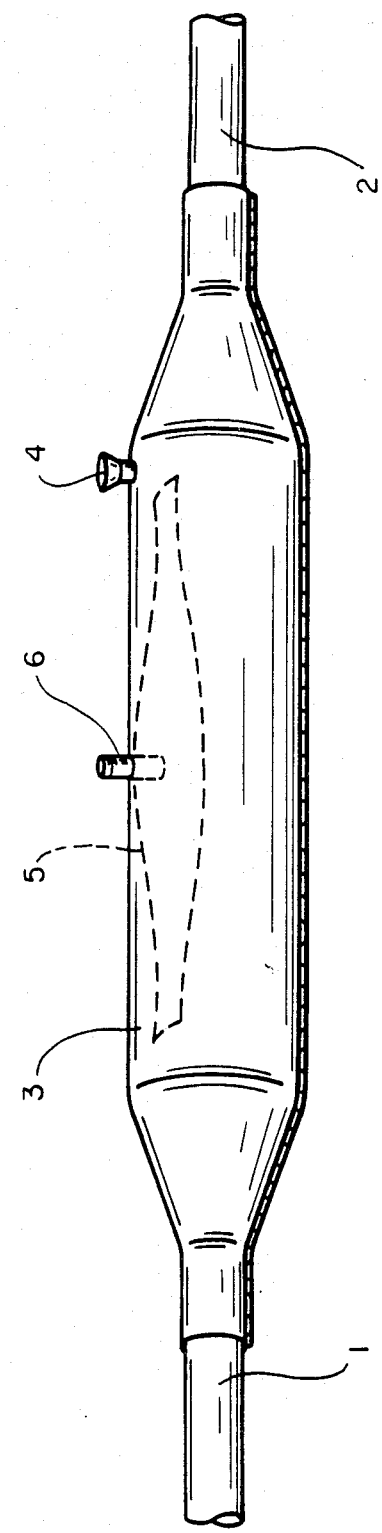

PROTECTION OF CABLE SPLICE

This application is a continuation of application Ser. No. 652,359, filed Sept. 18, 1984, and now abandoned.

BACKGROUND OF THE INVENTION

This invention relates to protecting a splice of multiconductor electrical cables from the ingress of water. Of particular interest are communication cables, such as telephone cables.

The multiconductor communications cables usually comprise a core containing a plurality of individually insulated wire conductors surrounded by an outer sheath. The cable core may contain a few pairs of conductors up to several hundreds or even thousands of pairs of conductors. The outer sheath of the cable usually is a plastic jacket surrounding a metal shield. Additional inner polymeric layers may be present. The cables are usually referred to as "filled" cables because the cable is usually filled with a filling compound such as a grease or petroleum jelly which helps prevent the ingress of water into the cable.

When two or more of the cables are spliced together, the jacket and other layers of the cable are removed near the end of the cable to expose the individual insulated conductors which are then individually connected to the conductors from the other cable or cables. After completion of the splice the entire splice area must be protected from ingress of water. Various devices and methods have been used for protection of such splices such as U.S. Pat. No. 3,361,605 to Gilbert, U.S. Pat. No. 3,895,180 to Plummer, and U.S. Pat. No. 3,992,569 to Hankins et al. Plummer and Hankins are typical examples of methods and apparatus used to protect cable splices of the type referred to above and are sometimes referred to as "buried splice closures." These types of cables are commonly used underground and the splices must be protected to prevent ingress of water when they are buried underground.

It is generally recognized that one of the paths through which water may enter the splice area and damage the individual spliced conductors by corrosion or short circuit is by migration through the interior of one or more of the cables spliced. Since such water migration occurs in the "filled" cables, it is necessary to provide splice protection method and apparatus to prevent water from entering the splice area from any path, including through the interior core of the cable. U.S Pat. No. 4,466,843 to Shimirak recognized the importance of applying pressure to the liquid sealant while the liquid sealant cures to form a water impenetrable seal.

The liquid sealants used to protect splices of the type referred to herein are generally curable liquid polymer systems which comprise a pre-polymer and a curing agent or hardener which can be mixed together and poured into the splice enclosure and allowed to cure. Particularly useful curable liquid sealants are the two-part polyurethane systems. The sealants normally used solidify to a gel-like consistency, i.e., the solid cured sealant has considerable elasticity to allow the sealant to conform to changes in size or shape of the splice area due to expansion or extraction or other mechanical forces acting on the splice area. These sealants are also usually reenterable.

SUMMARY OF THE INVENTION

This invention provides apparatus and methods for encapsulation and protection of a splice of multiconductor electric cable from the ingress of water which are simple in construction and operation. In addition, the effectiveness of the splice protection provided by this invention is not significantly affected by installer skill.

This invention provides an apparatus for protecting a splice connecting at least two multiconductor electric cables from ingress of water which comprises:
(a) a closure for enclosing a splice and forming a seal to the cable jackets, thereby forming an enclosed area for the splice and the cable ends; and
(b) pressure means inside the enclosed area capable of applying sufficient pressure to a liquid sealant in the enclosed area to force the liquid sealant to penetrate into the splice and the interstices between the conductors in the cables, and capable of being activated and controlled from outside the closure.

The invention further provides a method for protecting a splice connecting at least two multiconductor electrical cables from ingress of water which comprises:
(a) positioning a closure about the splice and sealing the closure to the cable jackets to form an enclosed area for the splice and the cable ends wherein the closure has an opening for introducing sealant into the enclosed area and a pressure means in the enclosed area for applying pressure to the liquid sealant;
(b) introducing a hardenable liquid sealant into the enclosed area, thereby displacing the air from the enclosed area;
(c) closing the opening; and
(d) pressurizing the pressure means to a pressure sufficient to force the liquid sealant to penetrate into said splice and into the interstices between the conductors in the cable; and
(e) maintaining said pressure in the enclosed area for a period of time to permit the liquid sealant to harden.

The invention further provides an assembly comprising:
(a) a splice connecting at least two multi-conductor electrical cables;
(b) a closure capable of maintaining pressure enclosing the splice and forming a seal to the cable jackets thereby forming an enclosed area for the splice and the cable ends;
(c) sufficient hardenable liquid sealant in the enclosed area to essentially filled the enclosed area; and
(d) pressure means positioned inside the enclosed area and capable of applying sufficient pressure to the liquid sealant in the enclosed area to force the liquid sealant to penetrate into the splice and the interstices between the conductors in the cables and capable of being activated and controlled from outside the closure;

whereby the splice is protected from ingress of water.

The closure useful in the invention as described above may be any conventional closure for cable splices, which is capable of maintaining its structural integrity under the pressures generated. Examples of such closures which may be readily adapted for use in the apparatus and method of this invention are the closures in U.S. Pat. No. 3,455,336 to Ellis, U.S. Pat. No. 4,135,587 to Diaz, U.S. Pat. No. 4,283,239 to Corke et al., U.S. Pat. No. 4,468,536 to Van Noten, and in the Hankins et al. U.S. Pat. No. 3,992,569 referred to above. It is generally preferred that the closure be a wraparound type closure, although a sleeve closure is equally effective, but is generally limited to new installations and is not practical in reentry situations. It is also generally preferred to use a heat-recoverable wraparound closure due to the ease of installation and the superior sealing and bonding the cable jackets obtained with the hot-melt adhesives. It may be particularly convenient to use a heat-recoverable wraparound enclosure which is self-recovering through an integral electrical heater.

The pressure means inside the enclosed area may be any pressure means which will exert the required pressure on the liquid sealant inside the closure and which can be activated and controlled from outside the closure. A preferred method means is a bladder which is connected through a valve to the outside of the closure. The bladder can be an elastic or rubber bladder which can be inflated through the valve communicating outside the closure. Other pressure means may be used, such as an expandable foam which expands in response to heat, whereby the heat can be applied to the outside of the closure heating the expandable foam causing it to pressurize the sealant contained within the closure. Alternatively, the heat-expandable foam may have an internal electric heater which may be powered from outside the closure. From the description contained herein, numerous other means will be obvious to one skilled in the art.

The sealants useful in this invention are those sealants which are liquid for some period of time to enable the filling of the closure and the application of the necessary pressure to effect the desired sealing and penetration of the splice, connectors and interstices between the conductors in the cables. Then the sealant should harden by chemical curing or other phenomenon to form a solid. In addition to conventional curing sealants, a noncurable sealant may be used, for example a molten liquid wax which will solidify at normal service temperatures. In the solid form the sealant is preferably somewhat elastic so it will conform to any slight changes in shape of the closure, the splice or the cables through, for example, expansion and contraction by temperature change. Conventional sealants are well known in the art and discussed in the background patents referred herein, which are incorporated herein by reference. The preferred sealants for use in this invention are the conventional two-package urethane sealants, which cure to a gel-like solid which is easily reenterable.

BRIEF DESCRIPTION OF THE DRAWING

FIG. 1 illustrates a cable splice closure containing a pressure means in accordance with this invention.

DETAILED DESCRIPTION OF THE INVENTION

Reference to FIG. 1 will illustrate the apparatus and methods of this invention. In FIG. 1 cables 1 and 2 are spliced together and the splice is enclosed by closure 3, which is a conventional heat-recoverable wraparound closure such as disclosed in U.S. Pat. Nos. 3,455,336 and 4,468,536 and as adapted to hold a pressure of about 20 psig. An opening in filler tube 4 is provided for introducing the liquid sealant into closure 3 and for allowing the air to escape from the closure. A rubber bladder 5 is positioned inside closure 3 and connected through valve 6 to the outside of the closure. In reference to FIG. 1 it can be seen that the closure 3 is filled with liquid sealant through opening 4, which is then closed after the closure is filled with the sealant and the air is removed. Bladder 5 is then inflated through valve 6 by air or other fluid to pressurize the sealant within closure 3. A preferred method for pressurizing the bladder 5 is through compressed air on a regulator valve set at a preselected pressure such as 15 psig. In this manner, when there is any movement of the sealant within the closure, the regulated air pressure automatically compensates and consistently maintains the pressure inside the closure at the desired level.

EXAMPLE

A sample was prepared for testing using a Western Electric type AFMW, 400 pair, "Flexgel" cable having 24 gauge conductors with PIC insulation. The splice was prepared with a 20-inch opening using Western Electric's 710-SB1-25 modular nonfilled connectors and a D-bond clamp (AT-8688 size 2) and a Raychem Type 6 bond bar. The connectors were arranged in two banks in a fold back arrangement. The closure used was an Xaga 2000 from Raychem Corporation. The sealant used was a D-encapsulant, which is two-part urethane curable sealant commercially available from Caschem Corporation and typically used in poured-in-place splice closures. The encapsulant was cooled to zero degrees centigrade in this test to assure sufficient time for filling the closure and removing the air before the encapsulant began to cure. After the closure was filled and the air removed and the opening in the closure sealed, the bladder inside the closure, which was constructed from a rubber bicycle tube sealed at two ends and connected to the outside of the closure through a valve stem, was pressurized with compressed air under a regulator valve set at 15 psig. The pressure was held at 15 psig for two hours and the air supply was shut off. Two days later the pressure stood at 12 psig. The closure was then subjected to a waterhead test on the core of the cable. Table 1 shows the result of this test in terms of the number of pairs of conductor failures out of the 400 pairs and the retained pressure inside the closure is also listed in the table.

TABLE I

| Time | Pressure (psig) | Pairs of Conductors Failed |
| --- | --- | --- |
| before waterhead test | 12.03 | 0 |
| after 4 hours at 4-foot waterhead | 12.32 | 0 |
| after 3 days at 4-foot waterhead | 11.68 | 0 |
| after 1 day at 8-foot waterhead | 11.67 | 0 |
| after 2 days at 8-foot waterhead | 11.71 | 0 |
| after 3 days at 8-foot waterhead | 11.25 | 0 |

What is claimed is:
1. An apparatus for protecting a splice connecting at least two multi-conductor electrical cables from ingress of water which comprises:
(a) a closure for enclosing the splice and forming a seal to the cable jackets thereby forming an enclosed area for the splice and the cable ends; and
(b) pressure means comprising a heat expandable material which can be activated by heat or electric current from outside the closure which pressure means is inside the enclosed area and capable of applying sufficient pressure to a liquid sealant in the enclosed area to force the liquid sealant to penetrate into the splice and the interstices between the conductors in the cables.

2. An assembly comprising:
 (a) a splice connecting at least two multi-conductor electrical cables;
 (b) a closure capable of maintaining pressure enclosing the splice and forming a seal to the cable jackets thereby forming an enclosed area for the splice and the cable ends;
 (c) sufficient hardenable liquid sealant in the enclosed area to essentially fill the enclose area; and
 (d) pressure means positioned inside the enclosed area and capable of applying sufficient pressure to the liquid sealant in the enclosed area to force the liquid sealant to penetrate into the splice and the interstices between the conductors in the cables and capable of being activated and controlled from outside the closure;
whereby the splice is protected from ingress of water.

3. An assembly according to claim 2, wherein the pressure means is a heat expandable material which can be activated by heat or electric current from outside the closure.

4. An assembly according to claim 2 wherein the pressure means is a flexible bladder which can be pressurized with a fluid from outside the closure.

5. A method for protecting a splice connecting at least two multiconductor electrical cables from ingress of water which comprises:
 (a) positioning a closure about the splice and sealing the closure to the cable jackets to form an enclosed area for the splice and the cable ends wherein the closure has an opening for introducing sealant into the enclosed area and a pressure means in the enclosed area for applying pressure to the liquid sealant;
 (b) introducing a hardenable liquid sealant into the enclosed area thereby displacing the air from the enclosed area;
 (c) closing the opening; and
 (d) pressurizing the pressure means to a pressure sufficient to force the liquid sealant to penetrate into said splice and into the interstices between the conductor in the cables; and
 (e) maintaining said pressure in the enclosed area for a period of time to permit the liquid sealant to harden.

* * * * *